UNITED STATES PATENT OFFICE.

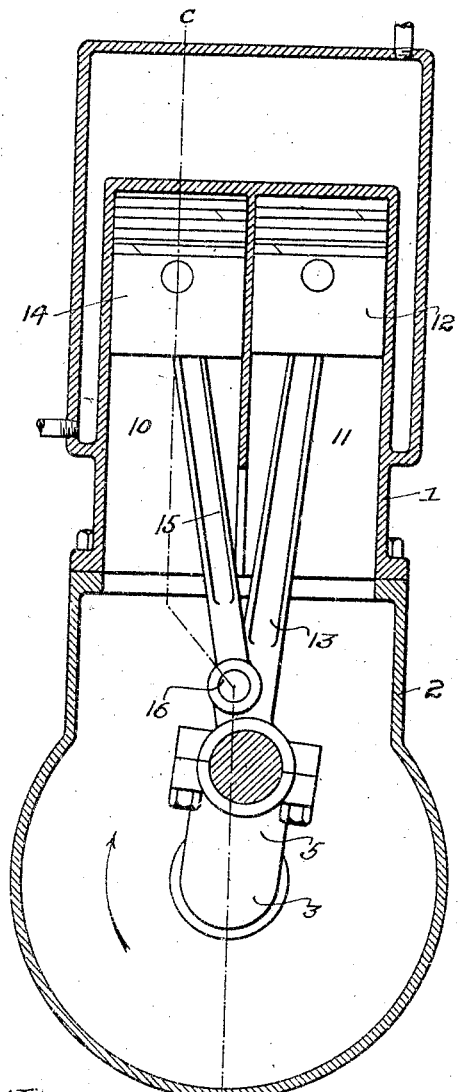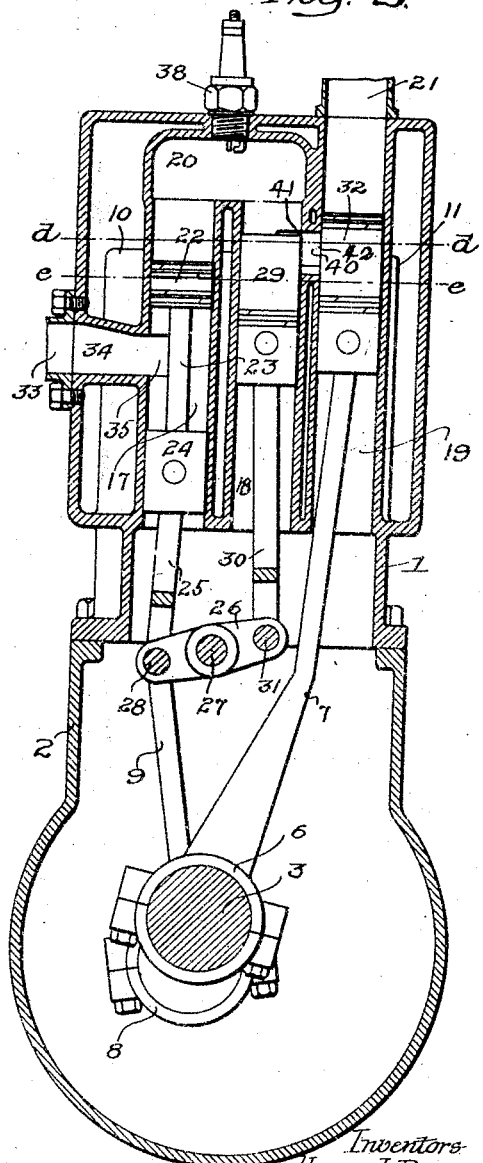

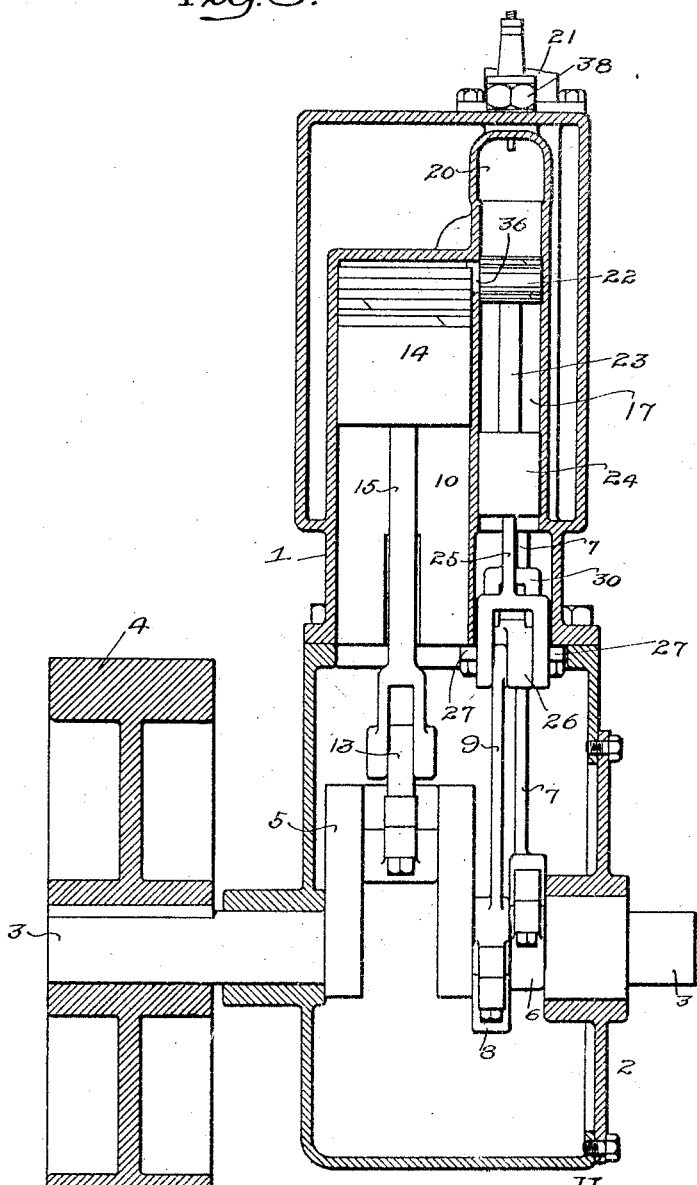

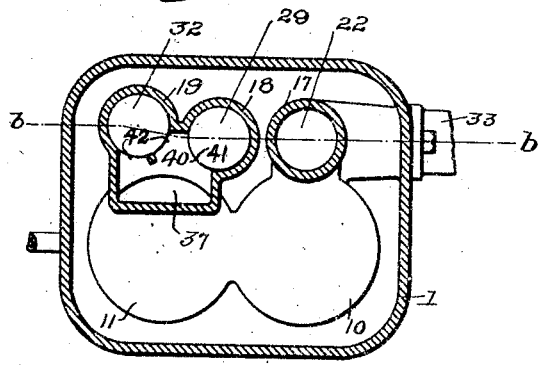
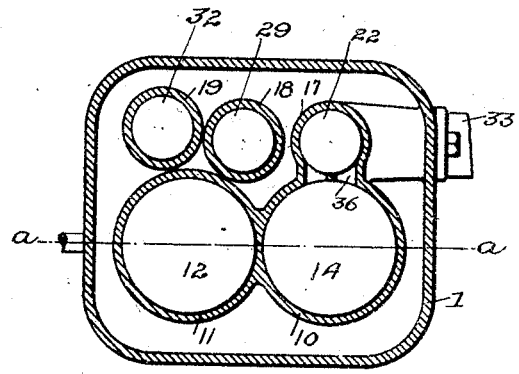

HARVEY L. REESE, OF SHARON HILL, AND HAVILAND H. PLATT, OF WALLINGFORD, PENNSYLVANIA, ASSIGNORS TO REESE-PLATT ENGINE COMPANY, OF WILMINGTON, DELAWARE, A CORPORATION OF DELAWARE.

INTERNAL-COMBUSTION ENGINE.

1,212,105.  Specification of Letters Patent.  Patented Jan. 9, 1917.

Application filed December 27, 1913. Serial No. 808,997.

*To all whom it may concern:*

Be it known that we, HARVEY L. REESE and HAVILAND H. PLATT, both citizens of the United States, and residing in Sharon Hill, Delaware county, Pennsylvania, and Wallingford, Delaware county, Pennsylvania, respectively, have invented certain Improvements in Internal-Combustion Engines, of which the following is a specification.

Our invention relates to internal combustion engines of the type in which a charge of fuel is compressed in one cylinder, transferred therefrom to a combustion chamber where it is ignited, and the products of combustion allowed to act on a piston in a working cylinder to cause the latter to do useful work.

One object of the invention is to provide an engine of the above noted type in which the parts are so arranged that the compression piston is always slightly ahead of the working piston, while the parts themselves are constructed and disposed in a relatively simple and substantial manner.

A further object of the invention is to provide an internal combustion engine of the above noted type, with a novel arrangement of valves and co-acting parts whereby certain of the valves are balanced, the arrangement and design being such as to insure the complete scavenging of both the combustion chamber and the working cylinder.

We also desire to provide an internal combustion engine which, in addition to being relatively efficient, shall not back fire, shall consist of but a minimum number of parts and have these so arranged that they shall not be likely to get out of order or require frequent inspection or repair.

Another object of the invention is to provide a novel method for operating an engine having the characteristics above noted.

These objects and other advantageous ends we secure as hereinafter set forth, reference being had to the accompanying drawings, in which:—

Figures 1 and 2 are transverse vertical sections taken on the lines $a$—$a$ Fig. 5 and $b$—$b$ Fig. 4 illustrating an engine constructed according to our invention; Fig. 3 is a vertical section taken on the line $c$—$c$ Fig. 1, and Figs. 4 and 5 are horizontal sections taken respectively on the lines $d$—$d$ and $e$—$e$ Fig. 2.

In the above drawings, 1 represents a cylinder casting to which is attached a crank case 2 having bearings for a main shaft 3. On the latter is fixed a fly wheel 4 and within the crank case said shaft is provided with a crank 5 and a pair of eccentrics, in this instance formed integral with it. One of these eccentrics is provided with a strap 6 to which is attached an eccentric rod 7, while the second eccentric has a strap 8 attached to and forming a part of a second eccentric rod 9.

The cylinder casting is formed with two cylinders 10 and 11, whose axes lie in a plane at right angles to the line of the shaft 3 so that said axes extend on opposite sides of said shaft, and in the latter cylinder is a working piston 12 connected by a rod 13 to the pin of the crank 5, while in the cylinder 10 is a compression piston 14 whose connecting rod 15 is pivoted or hinged to the connecting rod 13 by a pin 16 at a point adjacent its crank end.

In addition to the cylinders 10 and 11, we provide in the casting 1 three valve cylinders 17, 18 and 19, all of which are preferably so arranged that their axes are immediately adjacent to or within a plane parallel with the plane of the axes of the two cylinders 10 and 11. Of these cylinders the two first open at their lower ends into the upper part of the crank case and at their upper ends open into a combustion chamber 20, while the third valve cylinder extends through the cylinder casting 1 and opens on the top thereof, so as to directly communicate with an exhaust pipe 21.

Within the cylinder 17 is a piston valve 22 connected by a rod 23 with a cylindrical crosshead 24, which through a connecting rod 25 is operatively attached to one end of a rocker arm 26. This latter is pivotally mounted on a pin or spindle 27 bolted at its ends to the casting 1, and by means of a pin 28 which connects it to the rod 25, it is also connected to the upper end of the eccentric rod 9.

In the valve cylinder 18 is a piston valve 29 connected through a rod 30 with the second end of the rocker arm 26, to which it is held by a pin 31, while a third cylindrical valve 32 operates in the valve cylinder 19, and is directly connected to the eccentric rod 7. The fuel supply pipe 33 connects through a passage 34 and a port 35 with the valve cylinder 17 at about the middle point thereof. A second passage or port 36 extends from the upper part of this valve cylinder to the uppermost part of the compression cylinder 10, and by means of a port 37 and a lateral recess 40 the top of the working cylinder 11 is connected through ports 41 and 42 to both of the valve cylinders 18 and 19 respectively. For igniting the compressed charges in the combustion chamber we provide any suitable device such as the spark plug 38.

In the case shown we have illustrated a water jacket as completely surrounding the upper parts of the cylinders 10 and 11 and also the combustion chamber and valve cylinders, though obviously the arrangement of the cooling system may be varied as may be found advisable, without departing from our invention.

With the various parts in the positions illustrated in the drawings and the shaft 3 turning in the direction of the arrow Fig. 1, the compression piston has just passed the top of its stroke and the working piston is at or approaching the top of its stroke. If it be assumed that a charge has just been exploded in the combustion chamber, it will at once be noted that the port 36 connecting said chamber and the compression cylinder is closed, and the port 41 leading from this chamber to the working cylinder is slightly open. The port 42 opening from the recess 40 and from the working cylinder into the exhaust cylinder is obviously closed. The products of combustion are therefore free to expand in the working cylinder to force the piston 12 downwardly therein. At the same time the valve 29 also moves down, opening more fully the port 41, and before the piston reaches the lower end of its stroke said valve reverses its movement, finally cutting off communication with the combustion chamber. Before this occurs, however, and when the working piston is adjacent the lower end of its stroke, the exhaust valve 32 has moved downwardly and opened the port 42 into the exhaust cylinder. The products of combustion are then free to escape from the cylinder 11 through the ports 37, 42 and valve cylinder 19 into the exhaust pipe 21, and at the same time the products of combustion still remaining in the combustion chamber are also free to pass from it through the upper part of the valve cylinder 18, port 41, recess 40, port 42, and valve cylinder 19 into said exhaust pipe.

Slightly before the working piston 12 begins its downward stroke, the compression piston 14 starts to move down and almost immediately the valve 22 moves upwardly sufficiently to uncover the port 36 so that during this downward movement fuel is drawn from the supply pipe 33 through the passage 34, port 35, valve cylinder 17 and port 36 into said compression cylinder, which is finally practically full of fuel, when it with the working piston is at the lower end of its stroke.

As the two pistons start to move upwardly with the compression piston slightly in advance, the port 42 controlled by the exhaust valve 32 is still open, while the valve 29 is moving upward and just about to close the port 41, and the valve 22 having closed the port 36 is moving downward. The upward movement of the working piston therefore forces the products of combustion out through port 37, passage 40, port 42, and valve cylinder 19, into the pipe 21, while the piston 14 begins to compress the fuel in its cylinder 10. Finally the exhaust valve 32, after moving to the bottom of its stroke, reverses its movement and closes the exhaust port 42 shortly before the pistons reach the top of their strokes. In the meantime, the valve 29 has passed upwardly beyond the position shown in Fig. 2, and has started down so as to partly open the port 41 by the time that the working piston is at the top of its stroke. In the meantime, the valve 22 has moved down so as to open the port 36 to permit the fuel in the cylinder 10 to flow into the combustion chamber and just as the compression piston 14 reaches the top of its stroke, it again closes this port after all of the fuel has been forced out of said cylinder. Since, as before noted, the compression piston is in advance of the working piston, it has begun its downward stroke when the latter is at the top of its stroke, and preferably before said working piston has reached this point, when the parts are at or near the positions indicated in the drawings, the fuel charge in the combustion chamber is ignited. Thereafter the above cycle of operations is repeated.

With an engine constructed as described and shown, numerous advantageous results are obtained, among which may be noted the reduction in the number of parts and in the expense of manufacture, due to pivoting the connecting rod 15 to the connecting rod 13. This construction is particularly valuable since it conveniently permits the compression piston being set in advance of the working piston. Moreover, the friction and wear between the pistons and the cylinder walls is reduced to a minimum since at the time the maximum work is being done by the crank on the compression piston and also when the working piston is being forced down by the expanding gases of combustion, the connecting rods are comparatively much nearer coincidence with the axial lines of the cylinders than if the shaft 3 was provided with a crank for each cylinder and was mounted with its axis in the plane of the cylinder axes. As a result of this construction, the side thrust of the pistons is relatively slight, for at the time that the connecting rods are at the greatest angle to the lines of the cylinders, there is no load on them and when the load is on the pistons, the angle between the axes of the cylinders and their respective connecting rods is a minimum. Again, it is practically impossible with the construction shown for a backfire to occur, since the intake passage 34 cannot be brought into direct communication with the combustion chamber.

With our construction, not only are the products of combustion very thoroughly removed from the working cylinder, but prior to the introduction of a fresh charge to the combustion chamber, the latter is placed in direct communication with the exhaust so that the exhaust gases contained therein are permitted to escape. Further, since the valves 22 and 29 are connected by their rods 25 and 30 to opposite ends of the rocker arm 26, the force of the explosions exerted on said valves is completely balanced. Moreover, owing to the angular advance of the compression piston ahead of the working piston, any backward impulse due to improper timing is minimized, and the complete emptying of the compressor cylinder at the top of each stroke is made possible. In addition, it is to be noted that before the charge is fired, the compressor cylinder is completely cut off from the combustion chamber and the parts are customarily so adjusted that the firing takes place after the compressor piston reaches the top of its stroke and before the working piston reaches this point.

We claim:—

1. The combination in an internal combustion engine of a crank shaft; a working and a compression cylinder mounted with their center lines in a plane at right angles to the line of said shaft; a combustion chamber directly connecting said cylinders; a valve mounted to control the flow of fuel from a source thereof to the compression cylinder and from said cylinder to the combustion chamber; a second valve mounted to control the passage of products of combustion from the combustion chamber to the working cylinder; a third valve mounted to control the exhaust of products of combustion from the working cylinder, all of said valves being operative at one side of the cylinders; with mechanism for positively actuating said valves.

2. The combination in an internal combustion engine of a compression and a working cylinder; a crank shaft extending substantially at right angles to a plane passing through the center lines of said cylinders; a combustion chamber directly connecting the cylinders; three piston valves mounted at one side of said cylinders with their axes adjacent a single plane, for controlling the flow of fuel and the exhaust of products of combustion; with mechanism for positively operating said valves.

3. The combination in an internal combustion engine of a working cylinder; a combustion chamber; two valves mounted to operate in parallel lines for respectively controlling the flow of fuel to the combustion chamber and the passage of products of combustion from the same to said cylinder; mechanical elements connecting said valves to balance them; and means for operating the valves.

4. The combination in an internal combustion engine of a cylinder; a piston therein; a combustion chamber; two piston valves respectively controlling the flow of fuel to said combustion chamber and its passage therefrom to the cylinder; a rocker arm connected to both of said piston valves; and means for oscillating said rocker arm to operate the valves.

5. The combination in an internal combustion engine of a compression cylinder; a piston therein; a working cylinder; a piston in said working cylinder; a combustion chamber having two cylindrical valve chambers communicating therewith; piston valves in said latter chambers mounted to respectively control the flow of fuel to the combustion chamber from the compression cylinder and from said chamber to the working cylinder; rods connected to said valves; a rocker arm connecting both of said rods; and means for oscillating the said rocker arm to actuate the valves.

6. The combination in an internal combustion engine of a compression cylinder; a piston therein; a working cylinder; a piston in said working cylinder; a combustion chamber, having two cylindrical valve chambers communicating therewith; piston valves in said latter chambers mounted to respectively control the flow of fuel to the combustion chamber from the compression cylinder and from said chamber to the working cylinder; rods connected to said valves; a rocker arm connecting both of said rods; means for oscillating the said rocker arm to actuate the valves; with a valve for controlling the exhaust from the working cylinder; and means for actuating said latter valve.

7. The combination in an internal combustion engine of a compression cylinder; a piston therein; a working cylinder; a piston in said working cylinder; a combustion chamber having two cylindrical valve chambers communicating therewith; piston valves in said latter chambers mounted to respectively control the flow of fuel to the combustion chamber from the compression cylinder and from said chamber to the working cylinder; rods connected to said valves; a rocker arm connecting both of said rods; means for oscillating the said rocker arm to actuate the valves; with a valve mounted to control the exhaust of products of combustion from the working cylinder and from the combustion chamber.

8. The combination in an internal combustion engine of a cylinder; a piston therein; a combustion chamber having a valve chamber connected thereto, the latter chamber opening in the cylinder and to the exhaust; means for controlling the flow of fuel to the combustion chamber; a valve in the valve chamber mounted to control the passage of products of combustion from the combustion chamber to the cylinder; and valve mechanism arranged to permit exhaust of products of combustion directly both from the combustion chamber and from the said cylinder.

9. The combination in an internal combustion engine of a cylinder; a piston therein; two valve chambers connected with said cylinder; a combustion chamber communicating with said cylinder through one of the chambers; a piston valve mounted in said latter chamber; means for reciprocating said valve; with a valve in the second valve chamber connected to balance the force of explosions on the first valve.

10. The combination in an internal combustion engine of a compression cylinder; a working cylinder; pistons in said cylinders; three valves controlling the flow of fuel and products of combustion; a shaft; two eccentrics on said shaft; means for connecting the pistons to the shaft; means for actuating two of said valves from one of the eccentrics; and means for actuating the third valve from the other eccentric.

11. The combination in an internal combustion engine of a cylinder; a piston; two valve chambers both communicating with said cylinder through a single port; a combustion chamber connected to one of said valve chambers; valves in said valve chambers; and means for actuating said valves.

In testimony whereof, we have signed our names to this specification, in the presence of two subscribing witnesses.

HARVEY L. REESE.
HAVILAND H. PLATT.

Witnesses:
WILLIAM E. BRADLEY,
WM. A. BARR.